United States Patent
LoRicco et al.

(10) Patent No.: US 10,648,343 B2
(45) Date of Patent: May 12, 2020

(54) DOUBLE WALL TURBINE GAS TURBINE ENGINE VANE PLATFORM COOLING CONFIGURATION WITH MAIN CORE RESUPPLY

(71) Applicant: United Technologies Corporation, Farmington, CT (US)

(72) Inventors: Nicholas M. LoRicco, Windsor, CT (US); Dominic J. Mongillo, Jr., West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/886,054

(22) Filed: Feb. 1, 2018

(65) Prior Publication Data

US 2019/0211690 A1 Jul. 11, 2019

Related U.S. Application Data (60) Provisional application No. 62/615,379, filed on Jan. 9, 2018.

(51) Int. Cl.
*F01D 5/18* (2006.01)
*F01D 9/06* (2006.01)
(Continued)

(52) U.S. Cl.
CPC ............. *F01D 5/186* (2013.01); *F01D 9/041* (2013.01); *F01D 9/065* (2013.01); *F01D 25/12* (2013.01);
(Continued)

(58) Field of Classification Search
CPC .......... F01D 5/186; F01D 5/187; F01D 9/041; F01D 25/12; F01D 5/188; F01D 5/189; F01D 9/065
See application file for complete search history.

(56) References Cited

U.S. PATENT DOCUMENTS

| | | | |
|---|---|---|---|
| 5,320,485 A * | 6/1994 | Bourguignon | .......... F01D 5/187 415/115 |
| 5,344,283 A | 9/1994 | Magowan et al. | |

(Continued)

FOREIGN PATENT DOCUMENTS

EP 1882819 A1 1/2008

OTHER PUBLICATIONS

European Search Report for European Application No. 19151057.7 dated May 23, 2019.

*Primary Examiner* — Nathaniel E Wiehe
*Assistant Examiner* — Michael K. Reitz
(74) *Attorney, Agent, or Firm* — Carlson, Gaskey & Olds, P.C.

(57) ABSTRACT

An airfoil includes pressure and suction side walls that extend in a chord-wise direction between leading and trailing edges. The pressure and suction side walls extend in a radial direction to provide an exterior airfoil surface. A main-body core cooling passage is arranged between the pressure and suction walls in a thickness direction and extends radially toward a platform. An airfoil skin cooling passage is arranged in one of the pressure and suction side walls to form a hot side wall and a cold side wall. The hot side wall defines a portion of the exterior airfoil surface and the cold side wall defines a portion of the core passage. The airfoil skin cooling passage extends to a platform skin cooling passage arranged in the platform. A resupply hole fluidly connects the main-body core cooling passage and at least one of the airfoil skin cooling passage and the platform skin cooling passage.

12 Claims, 6 Drawing Sheets

(51) Int. Cl.
*F01D 9/04* (2006.01)
*F01D 25/12* (2006.01)
*F02C 3/04* (2006.01)

(52) U.S. Cl.
CPC .......... *F02C 3/04* (2013.01); *F05D 2220/323* (2013.01); *F05D 2240/81* (2013.01); *F05D 2250/75* (2013.01); *F05D 2260/202* (2013.01); *F05D 2260/204* (2013.01); *F05D 2260/2212* (2013.01); *F05D 2260/22141* (2013.01)

(56) References Cited

U.S. PATENT DOCUMENTS

| | | | |
|---|---|---|---|
| 5,720,431 A * | 2/1998 | Sellers | F01D 5/186 |
| | | | 416/97 R |
| 6,120,249 A * | 9/2000 | Hultgren | F01D 5/187 |
| | | | 416/97 R |
| 6,254,334 B1 * | 7/2001 | LaFleur | F01D 5/186 |
| | | | 415/115 |
| 6,454,526 B1 * | 9/2002 | Cunha | F01D 5/147 |
| | | | 415/115 |
| 7,819,629 B2 * | 10/2010 | Liang | F01D 5/187 |
| | | | 415/115 |
| 7,857,589 B1 * | 12/2010 | Liang | F01D 5/187 |
| | | | 416/97 R |
| 8,011,881 B1 | 9/2011 | Liang | |
| 8,047,788 B1 * | 11/2011 | Liang | F01D 5/187 |
| | | | 416/97 R |
| 8,096,772 B2 | 1/2012 | Liang | |
| 8,353,669 B2 | 1/2013 | Chon et al. | |
| 2009/0232660 A1 | 9/2009 | Liang | |
| 2016/0177782 A1 | 6/2016 | Hough et al. | |
| 2016/0376896 A1 | 12/2016 | Spangler et al. | |
| 2017/0002662 A1 * | 1/2017 | Waite | F01D 5/187 |
| 2017/0101932 A1 * | 4/2017 | Stover | F01D 5/189 |
| 2017/0145832 A1 | 5/2017 | Mongillo et al. | |
| 2017/0175548 A1 * | 6/2017 | Smith | F01D 5/187 |
| 2019/0211688 A1 * | 7/2019 | LoRicco | F01D 5/186 |

\* cited by examiner

DOUBLE WALL TURBINE GAS TURBINE ENGINE VANE PLATFORM COOLING CONFIGURATION WITH MAIN CORE RESUPPLY

CROSS-REFERENCE TO RELATED APPLICATIONS

This application claims priority to U.S. Provisional Application No. 62/615,379, which was filed on Jan. 9, 2018 and is incorporated herein by reference.

BACKGROUND

This disclosure relates to gas turbine engines and particularly to internally cooled turbine vanes.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

As is well known, the aircraft engine industry is experiencing a significant effort to improve the gas turbine engine's performance while simultaneously decreasing its weight. The ultimate goal has been to attain the optimum thrust-to-weight ratio. One of the primary areas of focus to achieve this goal is the "hot section" of the engine since it is well known that engine's thrust/weight ratio is significantly improved by increasing the temperature of the turbine gases. However, turbine gas temperature is limited by the metal temperature constraints of the engine's components. Significant effort has been made to achieve higher turbine operating temperatures by incorporating technological advances in the internal cooling of the turbine blades.

Various cooling passage configurations have been used to cool turbine vanes, but there may be some inadequacies in some applications. To this end, a double wall cooling configuration has been used to improve turbine vane cooling. In a double wall blade configuration, thin skin core cavity passages extend radially and are provided in a thickness direction between the core cooling passages and each of the pressure and suction side exterior airfoil surfaces. Double wall cooling has been used as a technology to improve the cooling effectiveness of a turbine blades, vanes, blade out air seals, combustor panels, or any other hot section component.

Turbine vanes need cooling on both the airfoil and the platforms. Conventional investment casting processes limit cooling designs to "pullable" cores, separating the airfoil and platform cooling circuits. Typical vane cooling design configurations will have cast cooling circuits on the airfoils and machined cooling holes on platforms. Given relatively flat combustor temperatures, significant flow is required to cool vane platforms and mateface gaps. Interstage gaps between the stationary and rotating turbine stages require a balance of sealing and purge flow to prevent hot gas from entraining into these areas and damaging the unprotected backsides of these components as well as non gaspath components with lower temperature capability. Introducing cooling air into the gaspath as a coolant imparts a cycle penalty reducing fuel efficiency of the engine, therefore making it desirable to utilize as little cooling air a possible to protect turbine components.

SUMMARY

In one exemplary embodiment, an airfoil includes pressure and suction side walls that extend in a chord-wise direction between leading and trailing edges. The pressure and suction side walls extend in a radial direction to provide an exterior airfoil surface. A main-body core cooling passage is arranged between the pressure and suction walls in a thickness direction and extends radially toward a platform. An airfoil skin cooling passage is arranged in one of the pressure and suction side walls to form a hot side wall and a cold side wall. The hot side wall defines a portion of the exterior airfoil surface and the cold side wall defines a portion of the core passage. The airfoil skin cooling passage extends to a platform skin cooling passage arranged in the platform. At least one resupply hole fluidly connects the main-body core cooling passage and at least one of the airfoil skin cooling passage and the platform skin cooling passage in order to mitigate excessive cooling air temperature heat pickup as well as increase local platform cooling cavity pressures to ensure an adequate pressure ratio is maintained between the platform cooling cavity and the local external leading edge airfoil, airfoil-platform fillet, and platform gas path surface static pressures. Sufficient airfoil and platform cooling cavity pressure is required in order to guarantee a positive back flow margin condition is maintained across platform film cooling holes considering worse part level casting and manufacturing blueprint tolerances, as well as, accounting for expected variations in both system level gaspath and supply systems.

In a further embodiment of any of the above, the platform skin cooling passage terminates at a fluid exit provided at the perimeter of the platform. The perimeter of the ID and OD platform surfaces includes axial and circumferential mate faces.

In a further embodiment of any of the above, the fluid exit is provided on at least one of the axial and circumferential mate faces.

In a further embodiment of any of the above, at least one of the airfoil skin cooling passage and the platform skin cooling passage includes trip strips, turbulators, pin fins and/or dimples.

In a further embodiment of any of the above, the airfoil skin cooling passage has an aspect ratio that may vary between $3:1 \geq H/W \geq 1:5$. H corresponds to a passage height and W corresponds to a passage width. The passage height (H) is in a range of 0.010-0.200 inches (0.25-5.08 mm).

In a further embodiment of any of the above, the platform skin cooling passage has an aspect ratio that may vary between $3:1 \geq H/W \geq 1:5$. H corresponds to a passage height and W corresponds to a passage width. The passage height (H) is in a range of 0.010-0.200 inches (0.25-5.08 mm).

In a further embodiment of any of the above, the airfoil is a turbine vane.

In a further embodiment of any of the above, the resupply hole has a ratio of length to hydraulic diameter (L/Dh) in a range of 1-20.

In a further embodiment of any of the above, the resupply hole is arranged at a bend fluidly connecting the airfoil skin cooling passage and the platform skin cooling passage.

In a further embodiment of any of the above, a film cooling hole extends from the airfoil, airfoil-fillet, and/or platform airfoil skin cooling passage to the exterior airfoil surface.

In another exemplary embodiment, a gas turbine engine includes a combustor section that is arranged fluidly between a compressor section and a turbine section. A stationary stage and a rotating stage are arranged in one of the compressor and turbine sections. An airfoil is arranged in one of the stationary and rotating stages. The airfoil includes pressure and suction side walls that extend in a chord-wise direction between leading and trailing edges. The pressure and suction side walls extend in a radial direction to provide an exterior airfoil surface. A main-body core cooling passage is arranged between the pressure and suction walls in a thickness direction and extends radially toward a platform. A airfoil skin cooling passage is arranged in one of the pressure and suction side walls to form a hot side wall and a cold side wall. The hot side wall defines a portion of the exterior airfoil surface and the cold side wall defines a portion of the core passage. The airfoil skin cooling passage extends to a platform skin cooling passage arranged in the platform. A resupply hole fluidly connects the main-body core cooling passage and at least one of the airfoil skin cooling passage and the platform skin cooling passage.

In a further embodiment of any of the above, the platform skin cooling passage terminates at a fluid exit provided at the perimeter of the platform. The perimeter includes axial and circumferential mate faces.

In a further embodiment of any of the above, the fluid exit is provided on at least one of the axial mate face and/or the circumferential mate face faces.

In a further embodiment of any of the above, the fluid exit is provided on the axial mate face or the circumferential mate face.

In a further embodiment of any of the above, the airfoil skin cooling passage has an aspect ratio that may vary between 3:1≥H/W≥1:5. H corresponds to a passage height and W corresponds to a passage width. The passage height (H) is in a range of 0.010-0.200 inches (0.25-5.08 mm).

In a further embodiment of any of the above, the platform skin cooling passage has an aspect ratio that may vary between 3:1≥H/W≥1:5. H corresponds to a passage height and W corresponds to a passage width. The passage height (H) is in a range of 0.010-0.200 inches (0.25-5.08 mm).

In a further embodiment of any of the above, the airfoil is a turbine vane arranged in the stationary stage of the turbine section.

In a further embodiment of any of the above, the resupply hole is within 0.40 inch (10 mm) of an intersection between the airfoil skin cooling passage and the platform skin cooling passage.

In a further embodiment of any of the above, the resupply hole is arranged at a bend fluidly connecting the airfoil skin cooling passage and the platform skin cooling passage.

In a further embodiment of any of the above, a film cooling hole extends from the airfoil skin cooling passage to the exterior airfoil surface.

BRIEF DESCRIPTION OF THE DRAWINGS

The disclosure can be further understood by reference to the following detailed description when considered in connection with the accompanying drawings wherein:

FIG. 4 is a cross-sectional view through an airfoil and platform of the vane, illustrating the core and skin passages and flow there through.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
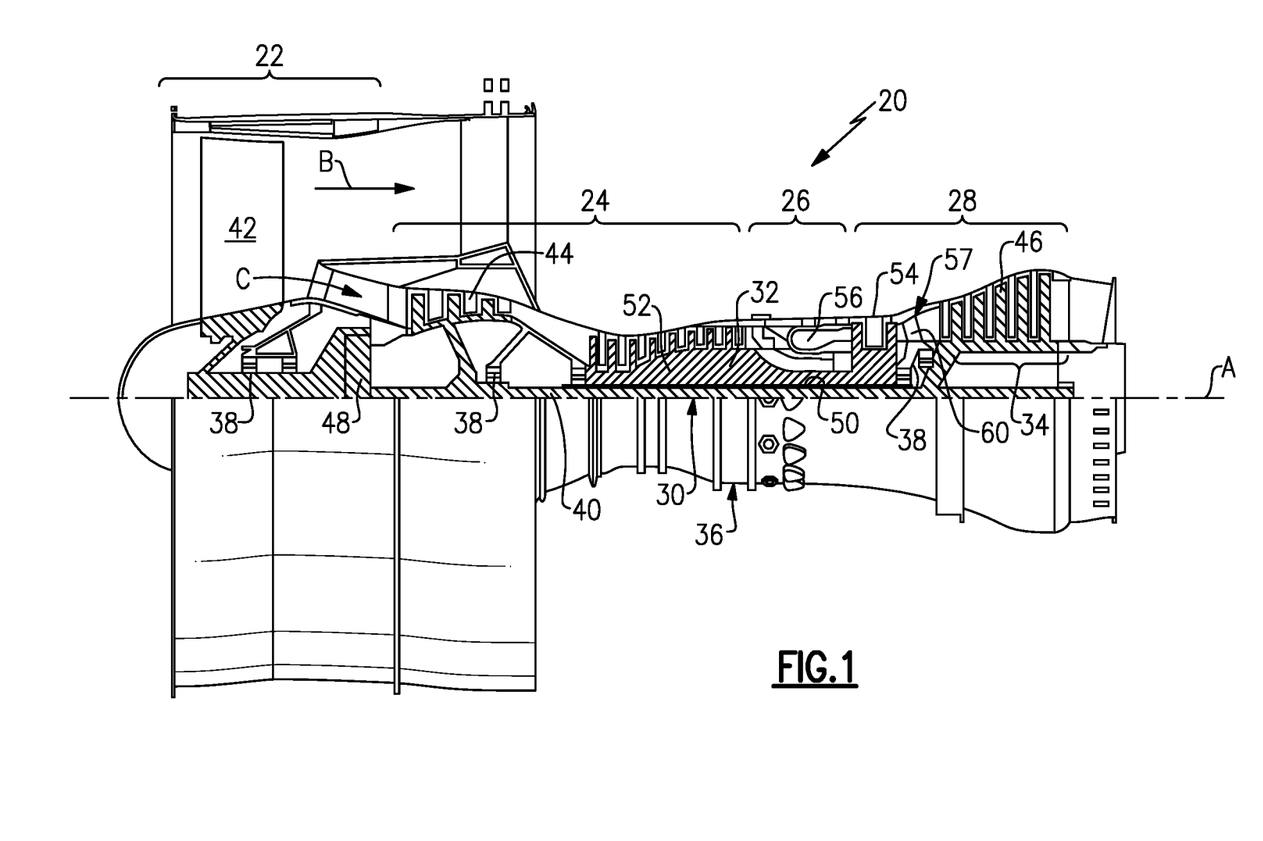
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The disclosed cooling configuration is particularly beneficial for turbine vanes of a gas turbine engine where internal cooling of the airfoil is provided and cooling of the vane platforms is desired, although the disclosed arrangement may also be used in the compressor section or for stator vanes. For exemplary purposes, a turbine vane 68 is described, although the disclosed cooling configuration may be used for blades as well.

Figure 2A:
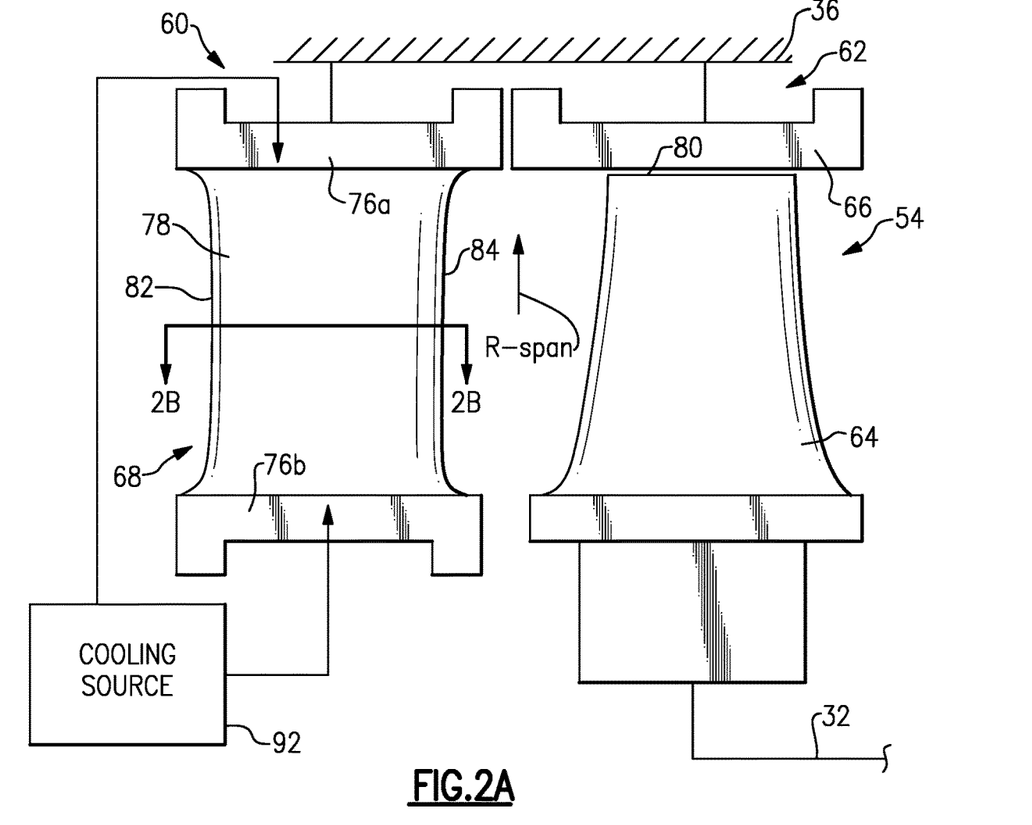
FIG. 2A is a schematic view of a turbine section having a stationary stage with vanes and a rotating stage with blades.
Figure 2B:
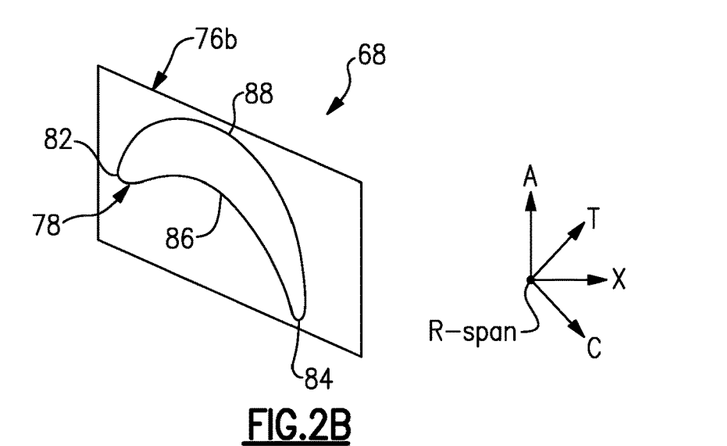
FIG. 2B is a plan view of the airfoil illustrating directional references taken along line 2B-2B in FIG. 2A.

Referring to FIG. 2A, stationary and rotating stages 60, 62 in the high pressure turbine section 54 are shown. The rotating stage 62 includes an array of blades 64 terminating in a tip 80 that is sealed relative to a blade outer air seal 66 supported by the static structure 36. The stationary stage 60 has an array of vanes 68 supported by the static structure 36. Each vane 68 includes at least one airfoil 78 extending spanwise in a radial direction R between outer and inner platforms 76a, 76b. The airfoil 78 has pressure and suction sides 86, 88 extending in a chord-wise direction and joined at leading and trailing edges 82, 84, as shown in FIG. 2B. The pressure and suction side walls 86, 88 extend in the radial direction R to provide an exterior airfoil surface.

Figure 4:
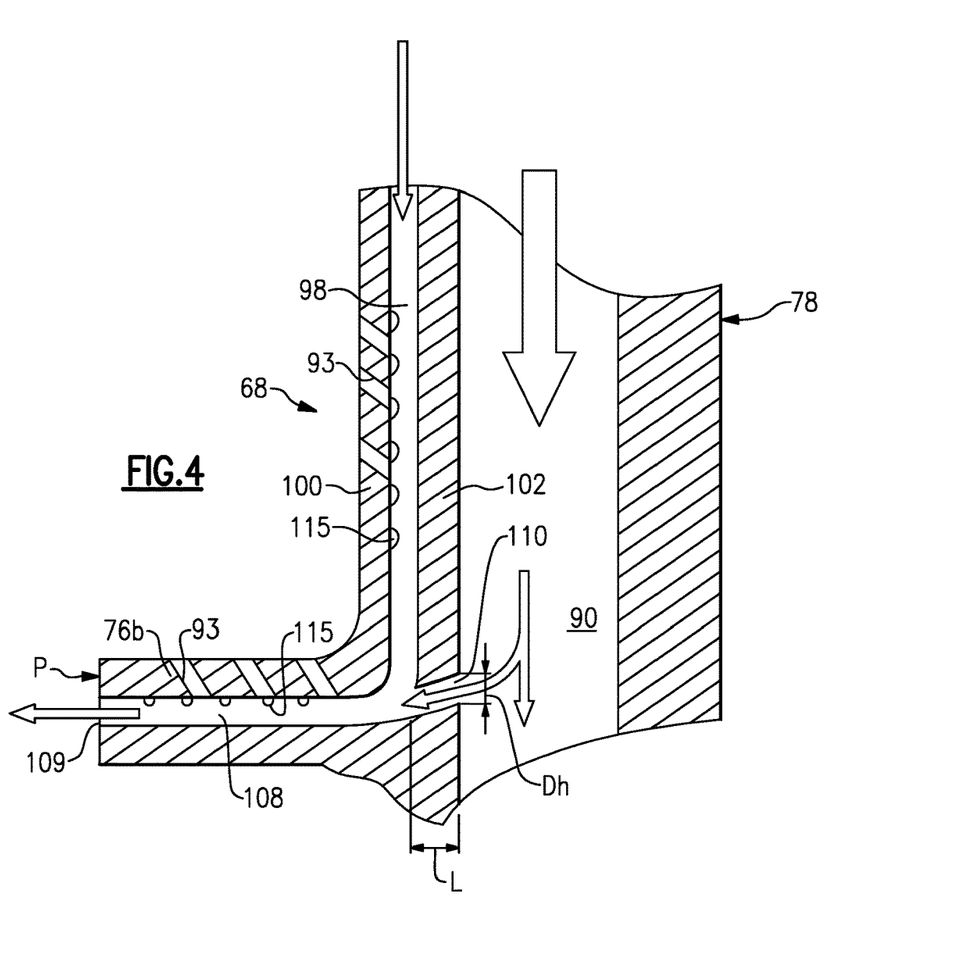
Figure 5:
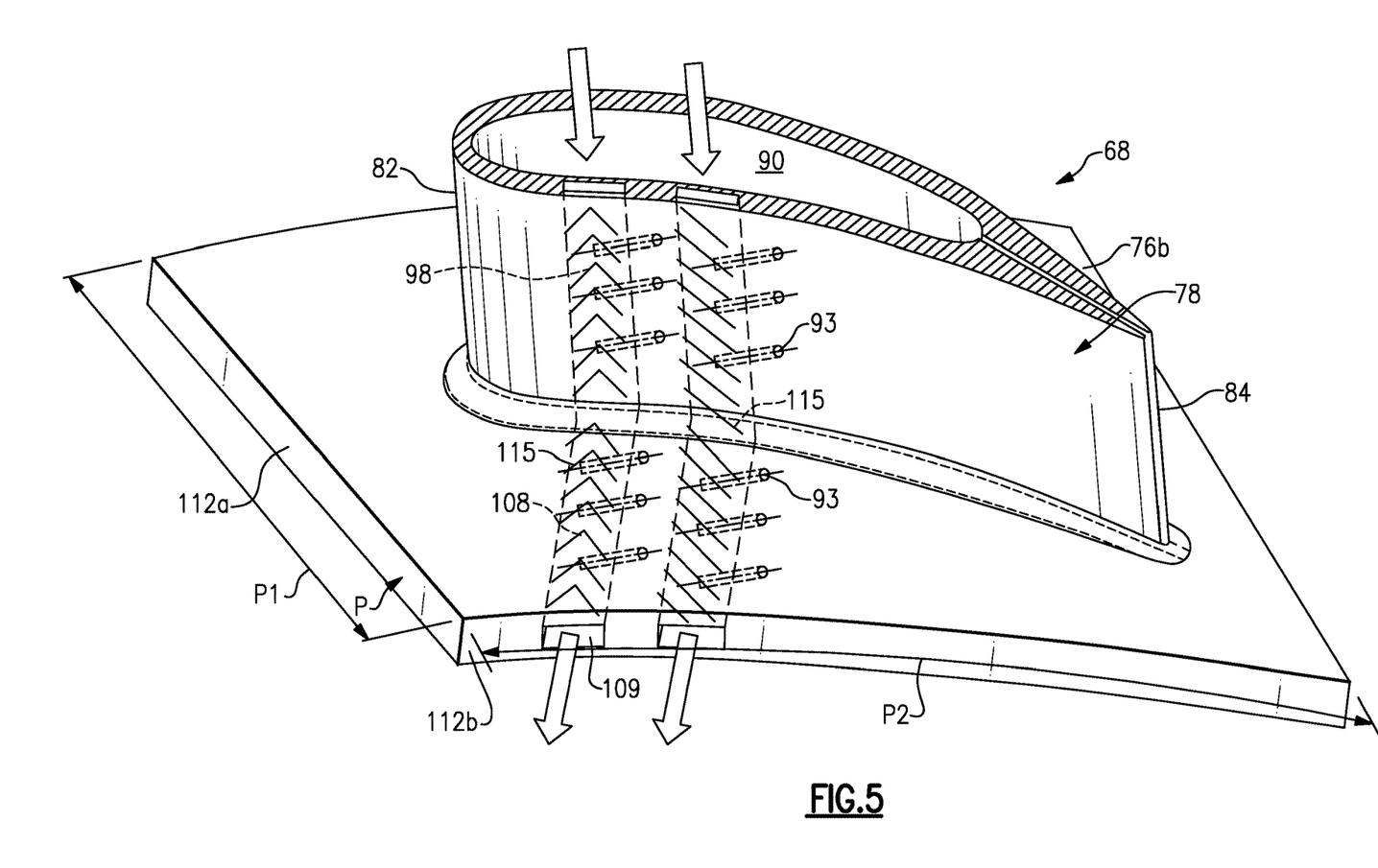
FIG. 5 is a schematic cross-sectional view of the vane with a platform cooling exit at a circumferential intrastage gap.
Figure 6:
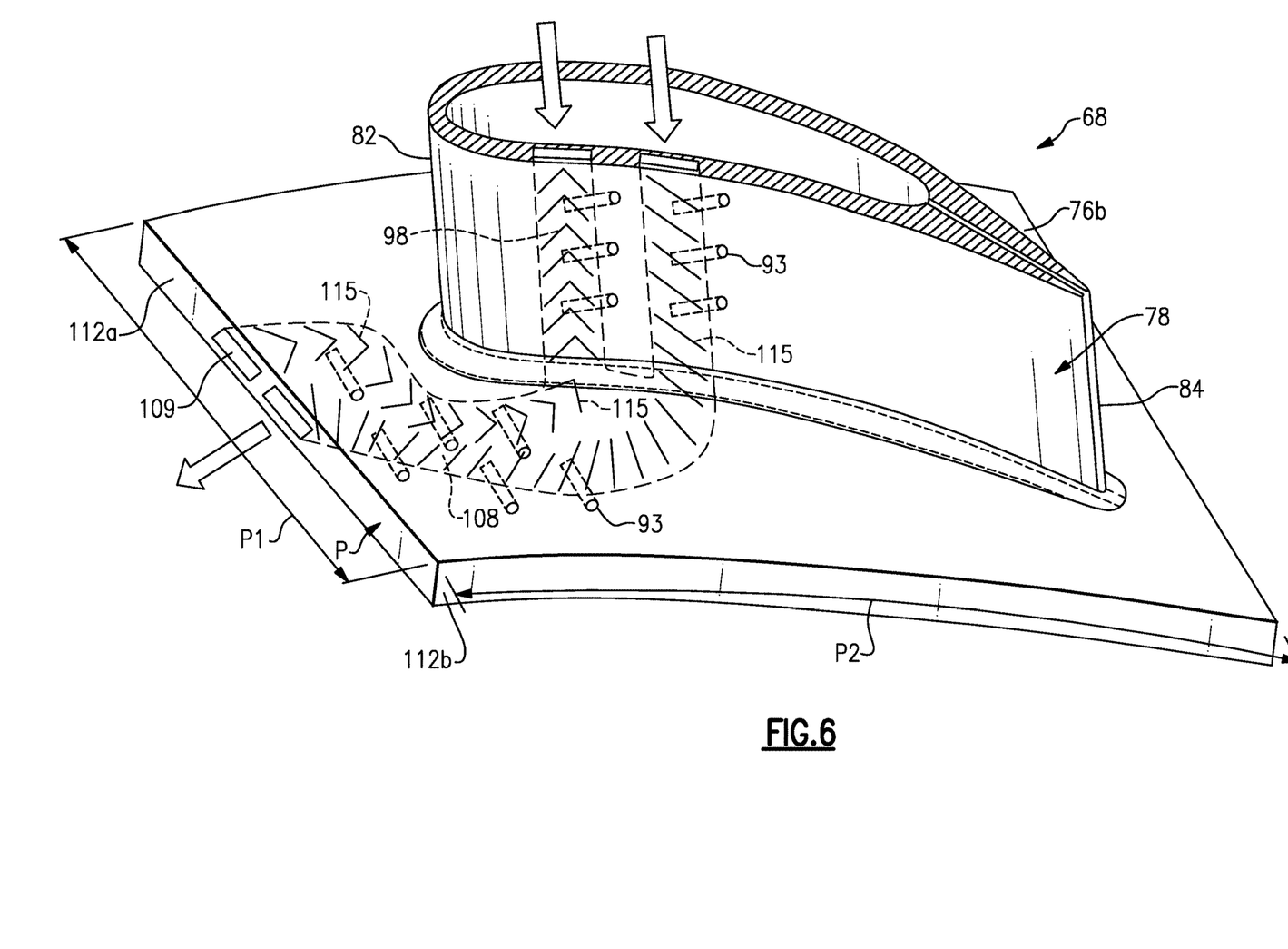
FIG. 6 is a schematic cross-sectional view of the vane with a platform cooling exit at an axial interstage gap.

The airfoil 78 includes at least one cooling passage provided between the pressure and suction walls 86, 88. The cooling passages are fed a cooling fluid from a cooling source 92, which is typically provided by a compressor bleed stage. Various cooling configurations may be used. For example, in FIG. 3, leading and trailing edge cooling passages 94, 96 are respectively provided near the leading and trailing edges 82, 84 as "up" passages refer to cooling passages that transport cooling fluid radially outward away from the engine centerline, in a direction towards a larger radial outboard location. Conversely, "down" passages, refer to cooling passages that transport cooling fluid radially inward toward the engine centerline, in a direction towards a smaller inboard location. The serpentine cooling passage (collectively referred to as "cooling passage 90") includes a first ("up") passage 90a near the leading edge cooling passage 94 that flows into a second ("down") passage 90b, which flows into a third ("up") passage 90c near the trailing edge cooling passage 96. The first, second and third passages 90a, 90b, 90c are separated by ribs. The serpentine cooling passage 90 and the leading and trailing edge cooling passages 94, 96 are referred to as "central main-body core" passages. A singular main-body core passage 90 is shown in FIGS. 4-6. Other cooling passage configurations may also be used. The airfoil's mean camber line bisects the core passages in the example shown.

Figure 3:
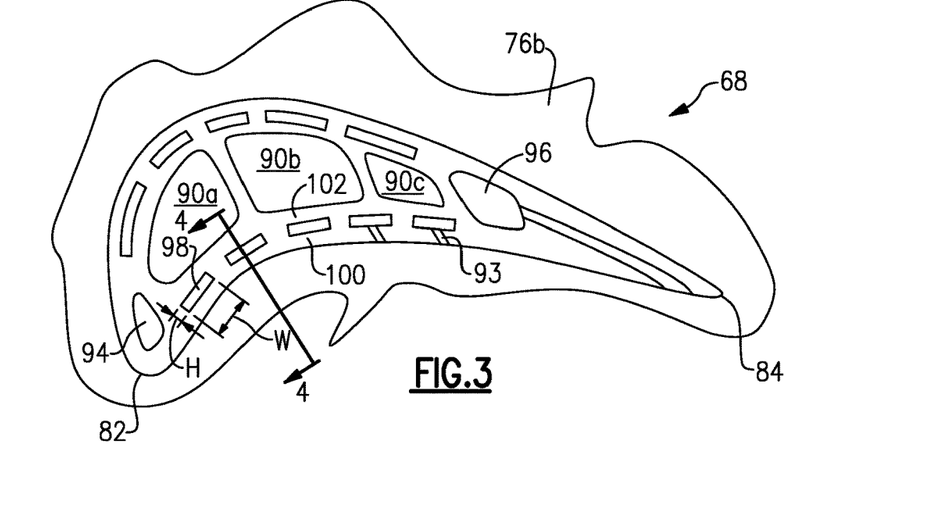
FIG. 3 is a cross-sectional view taken along line 2B-2B of FIG. 2A.
Figure 7:
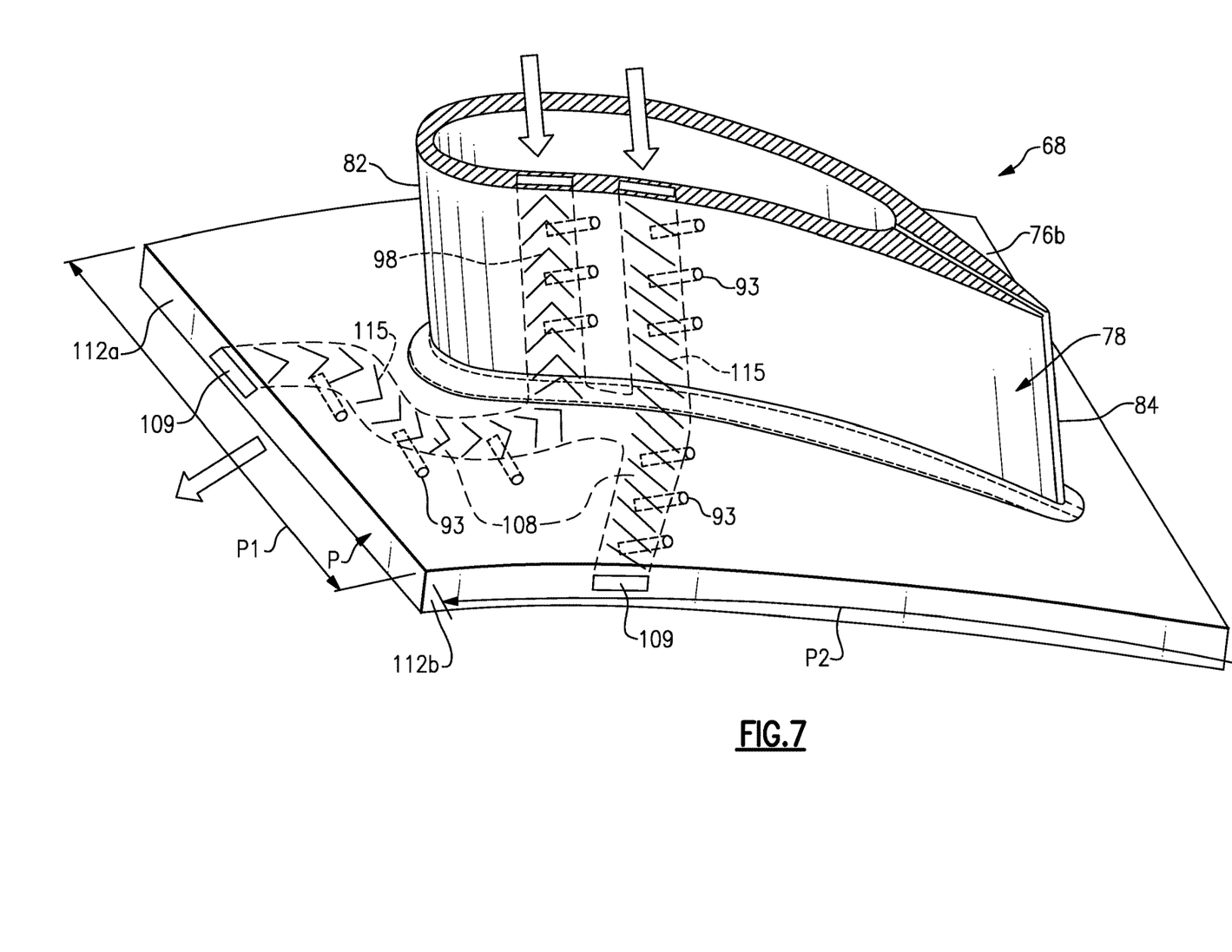
FIG. 7 is a schematic cross-sectional view of the vane with a platform cooling exit at an axial interstage gap and a circumferential intrastage gap.

Referring to FIGS. 2A and 3, a cooling source 92, such as bleed air from the compressor section 24 (FIG. 1), may be fluidly connected to the cooling passages 90, 94, 96 and skin passages 98 to cool the blade 64. The cross-section shown in FIG. 3 is more typical of a blade, but a simplified cooling passage may also be used, as is shown in FIGS. 5-7, which may be more typical of a vane.

As shown in FIGS. 3 and 4, one or more skin cooling passages 98 may be provided in the pressure and suction walls 86, 88, which separate these walls into a hot side wall 100 and a cold side wall 102. The hot side wall 100 provides the exterior airfoil surface and an outer surface of the airfoil skin cooling passage 98. The cold side wall 102 provides an inner surface of the airfoil skin cooling passage 98 and a central core cooling passage surface of the central core cooling passage. Film cooling holes 93 may be fluidly connected to the airfoil skin cooling passages 98 to create a thin film boundary layer that protects the airfoil 78 from hot gases in the core flow path C. The airfoil skin cooling passage 98, like the main-body core cooling passage 90, receives cooling fluid from the cooling source 92.

The airfoil skin cooling passages 98 typically have a much lower aspect ratio H/W, cavity height (H) to cavity width (W), than the "central main-body core" passages. Typically airfoil skin cooling passages have a cavity height (H) to cavity width (W) ratio that may vary in cavity aspect ratio between 3:1≥H/W≥1:5. The height of the skin passage 98, which is generally in the thickness direction and typically normal to a tangent line L at the exterior airfoil surface, is in a range of 0.010-0.200 inches (0.25-5.08 mm). The skin passage may vary in height and width along its length.

Referring to FIG. 4, the airfoil skin cooling passage 98 extends to a platform skin cooling passage 108 arranged in the platform, for example, the inner platform 76b. In the example, the airfoil skin cooling passage 98 and the platform skin cooling passage 108 are approximately normal, e.g., 90°+/−20° relative to one another. The platform skin cooling passage 108 has the same aspect ratio as the airfoil skin cooling passage 98, for example.

Referring to FIG. 5 and FIG. 6, the platform has a perimeter P with axially spaced mate faces 112a and circumferentially spaced mate faces 112b, as shown in FIGS. 5 and 6. That is, perimeter P is a length or distance that is defined by the platform shape. In this case the perimeter of the platform is made up of circumferential lengths P1 along each of the leading edge and the trailing edge. Additionally the perimeter P also comprises of an axial length P2 along each of the pressure side of the platform and the suction side of the platform. The axially spaced mate faces 112a may be arranged adjacent to a static component and/or rotating stage and provide an interstage gap, and the circumferentially spaced mate faces 112b are arranged adjacent to another vane 68 to provide an intrastage gap. In the example shown in FIG. 5, the platform skin cooling passage 108 terminates in a fluid exit 109 arranged at a circumferential mate face 112b. In the example shown in FIG. 6, the platform skin cooling passage 108 terminates in fluid exit 109 arranged at an axial mate face 112a. Any number of fluid exits may be used, and the fluid exit 109 may have any suitable exit geometries that may include, but are not limited to, circular, conical, elliptical, oval, or slot shapes that may be of constant cross sectional area, diffused, and/or converged shapes.

Particularly in high pressure turbine vane stages, there is a limited pressure ratio available for cooling. Due to the total length of the airfoil skin cooling passage 98 and the platform airfoil skin cooling passage 108, there will be significant pressure losses incurred due to the inherently high cooling air flow rate per unit area within the skin core cooling cavities due to the relatively small cross sectional passage area associated with "micro channel" inter-wall design configurations. The airfoil platform airfoil skin cooling passage 108 may include trip strips 115. Trip strips may also be provided in the airfoil skin cooling passage 98 (FIGS. 5-7). Turbulators, pin fins and/or dimples may also be used in addition to and/or instead of the trip strips. The high internal convective cooling achievable with rib roughened low aspect ratio airfoil skin cooling passages also produces increased frictional losses due to the relative relationship of the trip strip height to the cooling cavity passage height. As a result of the trip strip geometry consuming upwards of 30%-40% of the total skin core cooling cavity channel height, large turbulent vortices are generated. While these flow characteristics are beneficial for generating high internal convective heat transfer, the adverse consequences of increased internal pressure losses are undesirable if film cooling is required to mitigate locally high external heat flux conditions.

Additional bend losses will also be incurred as the cooling airflow is transitioned from a predominately radially oriented airfoil skin cooling passage, to an orthogonally oriented platform airfoil skin cooling passage. The increased thermal efficiency associated with the skin core cavity facilitates the convection of heat from the hot exterior wall to the working fluid. As a result of the excessive cooling air heat pick and pressure loss it becomes difficult to effectively cool the platform regions and mate faces. It therefore becomes necessary to mitigate both the excessive cooling air heat pickup (temperature rise), as well as, restore the internal cooling cavity pressures to ensure positive pressure ratio and minimum back flow margin requirements are maintained across airfoil, airfoil-platform fillet, and platform film cooling holes during engine operation. To address these challenges, the platform airfoil skin cooling passage 108 is resupplied with cooling fluid from the cooling source 92 before reaching the fluid exit 109.

Referring to FIG. 4, the vane 68 includes at least one resupply hole 110 that fluidly connects the main-body core cooling passage 90 and at least one of the airfoil skin cooling passage 98 and the platform skin cooling passage 108. To provide desired pressure and temperature to the platform skin passage, the resupply hole 110 is connected near an intersection, i.e., the bend, between the airfoil skin cooling passage 98 and the platform skin cooling passage 108. The resupply hole 110 has a ratio of length to hydraulic diameter (L/Dh) in a range of 1-20, and in one example, in a range of 1-10. In the example shown, the resupply hole 110 is arranged at the bend. As a result, internal pressures are maintained and temperatures in the platform skin core passage 108 are reduced to levels capable of achieving the required backside and film cooling effectiveness downstream of the resupply feature. Combining airfoil and platform cooling air with mate face purging may reduce cooling flow requirements to high pressure turbine vanes. This allows for airfoil walls to be less reliant on film cooling, which passes through the airfoil and exhausts on platform and mate faces.

Additive manufacturing and Fugitive Core casting processes allows design flexibility in gas turbine manufacturing. One of the design spaces that additive opens up is in the design of ceramic cores used in the investment casting process. Traditional ceramic cores are made with a core die, which has a finite number of "pull planes." These pull planes restrict the design of ceramic cores to prevent features from overhanging in the direction that the die is pulled when the cores are removed. Additive manufacturing and Fugitive Core processes can remove those manufacturing restrictions, as dies are no longer used to create the ceramic cores.

An additive manufacturing process may be used to produce an airfoil. Alternatively, a core may be constructed using additive manufacturing and/or Fugitive Core manufacturing may be used to provide the correspondingly cooling passage and cooling hole geometries when casting the airfoil. These advanced manufacturing techniques enable unique core features to be integrally formed as part of the entire ceramic core body and then later cast using conventional loss wax casting processes. Alternatively, powdered metals suitable for aerospace airfoil applications may be used to fabricate airfoil cooling configurations and complex cooling configurations directly. The machine deposits multiple layers of powdered metal onto one another. The layers are joined to one another with reference to CAD data, which relates to a particular cross-section of the airfoil. In one example, the powdered metal may be melted using a direct metal laser sintering process or an electron-beam melting process. With the layers built upon one another and joined to one another cross-section by cross-section, an airfoil with the above-described geometries may be produced, as indicated at. The airfoil may be post-processed to provide desired structural characteristics. For example, the airfoil may be heated to reconfigure the joined layers into a single crystalline structure.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil comprising:
   pressure and suction side walls extending in a chord-wise direction between leading and trailing edges, the pressure and suction side walls extending in a radial direction to provide an exterior airfoil surface, a main-body core cooling passage is arranged between the pressure and suction walls in a thickness direction and extends radially toward a platform, an airfoil skin cooling passage is arranged in one of the pressure and suction side walls to form a hot side wall and a cold side wall, the hot side wall defines a portion of the exterior airfoil surface, and the cold side wall defines a portion of the core passage, the airfoil skin cooling passage extends to a platform skin cooling passage arranged in the platform, the airfoil skin cooling passage is configured to receive a cooling fluid from a location upstream from the platform skin cooling passage, the platform skin cooling passage terminates at a fluid exit provided at the perimeter of the platform, the perimeter includes at least one of axial and circumferential mate faces, a resupply hole that is configured to supply from the main-body core cooling passage to at least one of the airfoil skin cooling passage and the platform skin cooling passage, wherein the airfoil skin cooling passage has an aspect ratio that may vary between 3:1≥H/W≥1:5, wherein H corresponds to a passage height and W corresponds to a passage width, wherein the passage height (H) is in a range of 0.010-0.200 inches (0.25-5.08 mm, and the platform skin cooling passage has an aspect ratio that may vary between 3:1≥H/W≥1:5, wherein H corresponds to a passage height and W corresponds to a passage width, wherein the passage height (H) is in a range of 0.010-0.200 inches (0.25-5.08 mm), wherein the resupply hole is arranged at a bend fluidly connecting the airfoil skin cooling passage and the platform skin cooling passage, the resupply hole is configured to supplement the cooling fluid with a resupply air from the main-body core cooling passage.

2. The airfoil of claim 1, wherein the fluid exit is provided on at least one of the axial and circumferential mate faces.

3. The airfoil of claim 1, wherein at least one of the airfoil skin cooling passage and the platform skin cooling passage includes trip strips, turbulators, pin fins and/or dimples.

4. The airfoil of claim 1, wherein the airfoil is a turbine vane.

5. The airfoil of claim 4, wherein the resupply hole has a ratio of length to hydraulic diameter (L/Dh) in a range of 1-20.

6. The airfoil of claim 1, wherein a film cooling hole extends from the airfoil skin cooling passage to the exterior airfoil surface.

7. A gas turbine engine comprising:
   a combustor section arranged fluidly between a compressor section and a turbine section;
   a stationary stage and a rotating stage arranged in one of the compressor and turbine sections;
   an airfoil arranged in one of the stationary and rotating stages, the airfoil includes pressure and suction side walls extending in a chord-wise direction between leading and trailing edges, the pressure and suction side walls extending in a radial direction to provide an exterior airfoil surface, a main-body core cooling passage is arranged between the pressure and suction walls in a thickness direction and extends radially toward a platform, an airfoil skin cooling passage is arranged in one of the pressure and suction side walls to form a hot side wall and a cold side wall, the hot side wall defines a portion of the exterior airfoil surface, and the cold side wall defines a portion of the core passage, the airfoil skin cooling passage extends to a platform skin cooling passage arranged in the platform, a resupply hole that is configured to supply fluid from the main-body core cooling passage to at least one of the airfoil skin cooling passage and the platform skin cooling passage, wherein the airfoil skin cooling passage has an aspect ratio that may vary between 3:1≥H/W≥1:5, wherein H corresponds to a passage height and W corresponds to a passage width, wherein the passage height (H) is in a range of 0.010-0.200 inches (0.25-5.08 mm, and the platform skin cooling passage has an aspect ratio that may vary between 3:1≥H/W≥1:5, wherein H corresponds to a passage height and W corresponds to a passage width, wherein the passage height (H) is in a range of 0.010-0.200 inches (0.25-5.08 mm), wherein the resupply hole is arranged at a bend fluidly connecting the airfoil skin cooling passage and the platform skin cooling passage; and
   a cooling source configured to provide a cooling fluid, wherein the cooling fluid is supplied to the airfoil skin cooling passage at a location upstream from the platform skin cooling passage, the platform skin cooling passage terminates at a fluid exit provided at the perimeter of the platform, the perimeter includes at least one of axial and circumferential mate faces, the resupply hole is configured to supplement the cooling fluid with a resupply air from the main-body core cooling passage.

8. The gas turbine engine of claim 7, wherein the fluid exit is provided on at least one of the axial mate face and the circumferential mate face.

9. The gas turbine engine of claim 7, wherein the fluid exit is provided on the axial mate face or the circumferential mate face.

10. The gas turbine engine of claim 7, wherein the airfoil is a turbine vane arranged in the stationary stage of the turbine section.

11. The gas turbine engine of claim 10, wherein the resupply hole has a ratio of length to hydraulic diameter (L/Dh) in a range of 1-20.

12. The gas turbine engine of claim 7, wherein a film cooling hole extends from the airfoil skin cooling passage to the exterior airfoil surface.

* * * * *